United States Patent Office 3,285,897
Patented Nov. 15, 1966

3,285,897
PROCESS OF PREPARING SOLID
POLY(ALLYL ALCOHOL)
Edward M. Sullivan and Frederick P. Reding, Charleston, and Edgar W. Wise, South Charleston, W. Va., assignors to Union Carbide Corporation, a corporation of New York
No Drawing. Filed Dec. 30, 1960, Ser. No. 79,572
5 Claims. (Cl. 260—91.3)

The present invention is concerned with a process for the free-radical catalyzed polymerization of allyl alcohol whereby novel, solid, high-molecular weight poly(allyl alcohol) products are obtained.

It has heretofore been known that certain allyl compounds such as allyl alcohol polymerize only with difficulty, yielding liquid homopolymeric products of low molecular weight. It is also known that the presence of such allyl monomers often tends to retard both the rate and degree of polymerization in reactions in which other copolymerizable monomers are also involved. Attention is drawn in this connection to the publications, "Allyl Polymerizations," R. C. Liable, Chem. Rev., 58, 807 (1958) and "Vinyl and Related Polymers," Schildknecht, J. Wiley and Sons, 391 and 411 (1952). As indicated in these publications, the major difference between allyl polymerizations and other types of polymerization, such, for instance, as those involving vinyl monomers, is attributable to the role played by chain-transfer, especially degradative chain-transfer, during allyl polymerization, particularly when free-radical polymerization catalysts are employed.

By way of illustration, in addition to conventional chain-initiation, chain-propagation and chain-termination, another type of chain-transfer reaction that can occur during the polymerization of allyl alcohol, for example, involves both the allyl alcohol monomer and a free-radical formed either from the active growing polymer chain or from the free-radical polymerization catalyst when employed, and entails the loss of a hydrogen atom or a hydroxyl radical to the free-radical by the allyl alcohol monomer. The monomer free-radical thus produced, i.e.

$$CH_2=CHCH_2$$

or $CH_2=CHCHOH$ is stabilized by resonance as indicated by Equations 1 and 2 below, which in effect also makes the abstraction and transfer of the hydrogen atom or hydroxyl radical easier.

(1)     $CH_2=CHCH_2 \rightleftharpoons CH_2CH=CH_2$
(2)     $CH_2=CHCHOH \rightleftharpoons CH_2CH=CHOH$ Consequently, the monomer free-radical is less reactive, that is to say, has less of a tendency to initiate a new polymer chain. At the same time, the gain of a hydrogen atom or a hydroxyl radical by the growing polymer chain terminates the chain. Such a chain-transfer reaction, therefore, is virtually and essentially a termination reaction and, accordingly, has come to be referred to in the polymer art as "degradative chain-transfer."

In the light of this knowledge, it is believed that prior efforts to produce high-molecular weight allyl polymers, and particularly allyl alcohol homopolymers, have heretofore been unrewarded to a large extent due to degradative chain-transfer. It is also believed that degradative chain-transfer is responsible for the large amounts of free-radical polymerization catalyst often required in conventional allyl polymerizations, e.g. amounts of about 2 mole percent or more based upon the monomer, since growing polymer chains are thereby terminated after only relatively few monomer units have been added. The allyl alcohol homopolymers heretofore obtained by prior art polymerization processes, for example, have invariably been relatively low-molecular weight, liquid polymers.

Unexpectedly, it has now been found that allyl alcohol can be polymerized via polymerization reactions in which chain-propagation is highly favored over degradative chain-transfer, so as to obtain as products solid, high-molecular weight allyl alcohol homopolymers. More particularly, the present invention depends upon the finding that solid, high-molecular weight allyl alcohol homopolymers can be produced by polymerizing allyl alcohol in contact with a catalytic amount of a free-radical polymerization catalyst at high pressure of at least about 15,000 pounds per square inch. The solid allyl alcohol homopolymers of this invention thus obtained can, in turn, be employed to produce elastomeric films, coatings, moldings, laminates and the like.

Unlike the low-molecular weight, liquid allyl alcohol homopolymers known to the art, the poly(allyl alcohol) products produced by the process of this invention are solid, high-molecular weight, glass-like, amorphous, elastomeric homopolymers having a relative viscosity of at least 1.01, and generally in the range of from about 1.02 to about 1.1 to 1.2 or slightly higher. The term "relative viscosity" is well known in the polymer art and designates the value obtained by dividing the viscosity of a solution of the polymer by the viscosity of the pure solvent, as derived, for instance, from the following equation:

$$\text{Relative Viscosity} = C_s T_s / C_o T_o$$

wherein $C_s$ is the density of the polymer solution, $C_o$ is the density of the pure solvent, $T_s$ is the efflux time of the polymer solution and $T_o$ is the efflux time of the pure solvent, the efflux time being measured, for example, suing an Ubbelohde viscometer. Moreover, in all instances, unless otherwise specifically stated, the relative viscosities described herein and in the appended claims define the values obtained from measurements using, as the polymer solution, a 0.2 percent by weight solution of the polymer in dimethyl formamide and determined at a temperature of 30° C. Thus obtained, the relative viscosity of a polymer is regarded as a measure of the molecular weight of the polymer, with a higher relative viscosity value indicating a higher molecular weight for the polymer.

In an embodiment of the process of this invention, allyl alcohol and a free-radical polymerization catalyst are brought into intimate contact at a pressure and temperature within the ranges herein prescribed. The polymerization catalysts which are suitable for use in the process of this invention are the conventional free-radical catalysts commonly employed in addition polymerization reactions. Thus, the term "free-radical polymerizations catalyst" is used herein to refer to compounds which contain —O—O— or —N=N— structural linkages, or are capable of forming these linkages by the action of dilute inorganic acids, or which otherwise produce free-radicals in situ during the polymerization reaction. As suitable catalysts, one can employ, for example, oxygen; hydrogen peroxide; acyl or aroyl peroxides such as benzoyl peroxide, acetyl peroxide, lauroyl peroxide, tertiarybutyl hydroperoxide, ditertiarybutyl peroxide, dibenzoyl peroxide, methyl benzoyl peroxide, acetyl benzoyl peroxide, peracetic acid, etc.; alkali metal persulfates such as sodium- and potassium persulfates, etc.; alkali metal- and ammonium perborates and percarbonates; alkyl percarbonates such as isopropyl percarbonate and butyl percarbonate, etc.; azo compounds such as azobisisobutyronitrile; azobis(dimethylvaleronitrile), dimethyl azobisisobutyrate, azobisisobutyramide, etc.; trialkylborons such as tributylboron and trioctylboron, etc. and the like.

The concentration of the free-radical polymerization catalyst that is employed in the process of this invention can vary broadly in the range of from about 0.01 mole percent to about 1 mole percent of catalyst based upon the allyl alcohol monomer, with catalytic amounts below or above this range also being suitable for use. However, little additional advantage, if any, may accrue from the use of catalyst concentrations in excess of this range, while the rate of polymerization may rapidly decrease when lesser catalytic concentrations are employed. The preferred catalyst concentration is from about 0.1 mole percent to about 0.5 mole percent of catalyst based upon the monomer. Such amounts of catalyst, it is to be noted, are generally below those ordinarily employed in allyl polymerization. This advantage is attributable to the fact that, as hereinabove described, chain-propagation is highly favored over degradative chain-transfer in the process of this invention.

The pressure employed in the polymerization process of this invention is of salient importance thereto, and should be at least about 15,000 pounds per square inch if chain-propagation is to be highly favored over degradative chain-transfer during the reaction, as is required for the production of the solid, high-molecular weight allyl alcohol homopolymers of this invention. The maximum pressure which can be employed is restricted solely by the limitations imposed by the equipment utilized. Hence, pressures of from about 15,000 pounds per square inch to about 125,000 pounds per square inch or higher can satisfactorily be employed. The preferred pressure range is from about 20,000 pounds per square inch to about 100,000 pounds per square inch.

The polymerization temperature can vary broadly in the range of from about $-80°$ C., or slightly lower, to about $+100°$ C., or slightly higher, with temperatures of from about $-10°$ C. to about $+70°$ C. being preferred. A balance of pressure and temperature must be achieved to prevent decomposition, as is well known in the art among those skilled in high pressure polymerization reaction, with especially good results, being realizable using higher pressures in conjunction with lower temperatures within the aforementioned ranges. As also recognized by those skilled in the art of polymerization reactions, the temperature to be employed may also depend in part upon the particular polymerization catalyst used. Thus, for instance, somewhat lower polymerization temperatures of from about $-10°$ C. to about 30° C. are more preferably employed in conjunction with the use of trialkylboron catalysts as compared with the more preferred use of polymerization temperatures of from about 30° C. to about 70° C. in conjunction with the use of peroxidic catalysts.

The polymerization process of this invention can be carried out continuously in a tubular reactor, semi-continuously or batchwise, with or without a diluent such as toluene, benzene, heptane, etc. In any event, vigorous agitation and good cooling should be employed, particularly in bulk- or large-scale operations, so as to provide for the rapid removal of the heat of polymerization. Upon carrying out the polymerization for a period of time sufficient to produce a solid poly(allyl alcohol) product, which period can vary from as little as about 1 hour or less, up to three or more days, if desired, the resulting polymer can be recovered by any convenient means such as by precipitation, filtration, evaporation, etc.

In similar manner, allyl alcohol can also be polymerized with minor amounts of other monomers which are copolymerizable therewith, such as vinyl- and other allyl monomers, to form solid, high-molecular weight copolymeric products.

The following examples further serve to define and illustrate the invention but are not to be construed as limitative thereof. In the examples, the term "glass-transition" temperature, where employed, is meant to define the softening point of the polymer, and was determined in the following manner. An Ames dial gauge, with a spring load of about 125 grams, was fitted with an adaptor to allow a 50 mil diameter point to press against a cold 10 to 20 mil thick pressed plaque prepared from the polymer, thus applying a force of about 140 pounds per square inch to the polymer at the point of contact. The polymer was heated so that the temperature increased at a rate of about 2° C. per minute, and the concomitant increase in depth of penetration of the gauge point was recorded. The depth of penetration in 0.01 mm. increments was then plotted graphically against the temperatures at which the values were obtained. The first sharp increase in penetration with increasing temperature, as indicated by an abrupt change in the slope of the graph, is associated with and determinative of the glass-transition temperature or softening point of the polymer.

*Example I*

A 10-milliliter static tube reactor 8 inches long and having an inner diameter of $5/16$ inch was charged under a nitrogen atmosphere with 0.2 milliliter of a 50 percent by weight solution of tributylboron in isooctane, and 9.8 milliliters of cold allyl alcohol, at a temperature of $-70°$ C. The charge was compressed to 50,000 pounds per square inch and maintained at this pressure by the injection of additional allyl alcohol, and at a temperature of between $-71°$ C. and $-74°$ C. for a period of 12 hours. Conducted in this manner, the ensuing polymerization reaction produced 0.131 gram of a solid homopolymer of allyl alcohol having a relative viscosity of 1.02.

*Example II*

To the reactor and in the manner described in Example I, there were charged 0.2 milliliter of a 50 percent by weight solution of tributylboron in isooctane, and approximately 10 milliliters of allyl alcohol, at a temperature of $-70°$ C. The charge was compressed to 75,000 pounds per square inch and maintained at this pressure by the injection of additional allyl alcohol, and at a temperature of 0° C. for a period of 13 hours. The polymerization reaction produced 0.748 gram of a solid homopolymer of allyl alcohol having a relative viscosity of 1.018.

*Example III*

To the reactor and in the manner described in Example I, there were charged 0.05 gram of azobisisobutyronitrile and 10 milliliters of allyl alcohol at room temperature. The charge was compressed to 16,800 pounds per square inch and maintained at this pressure by the injection of additional allyl alcohol, and at a temperature of 70° C., for a period of 12 hours. The polymerization reaction produced 0.698 gram of a solid homopolymer of allyl alcohol having a relative viscosity of 1.02.

*Example IV*

To the reactor and in the manner described in Example I, there were charged 0.2 milliliters of a 50 percent by weight solution of tributylboron in isooctane, and 10 milliliters of allyl alcohol, at a temperature of $-10°$ C. The charge was compressed to 75,600 pounds per square inch and maintained at this pressure by the injection of additional allyl alcohol, and at a temperature of 0° C., for a period of 18 hours. The polymerization reaction produced 0.929 gram of a solid homopolymer of allyl alcohol having a relative viscosity of 1.016 and a glass-transition temperature of between 55° C. and 60° C.

A 0.693-gram sample of the polymer was molded at a temperature of 45° C. and at a pressure of 1000 pounds per square inch using a Buehler hydraulic press to produce a flexible plaque having a thickness of between 26.5 and 27 mils. The plaque was non-sticky and elastomeric.

Example V

To the reactor and in the manner described in Example I, there were charged 0.05 gram of azobisisobutyronitrile and 10 milliliters of allyl alcohol at room temperature. The charge was compressed to 100,800 pounds per square inch and maintained at a pressure of between 100,800 and 105,600 pounds per square inch by the injection of additional allyl alcohol, and at a temperature of 70° C., for a period of 9.5 hours. The polymerization reaction produced 1.67 grams of a solid homopolymer of allyl alcohol having a relative viscosity of 1.019.

Example VI

To the reactor and in the manner described in Example I, there were charged 0.025 gram of benzoyl peroxide and 10 milliliters of allyl alcohol at room temperature. The charge was compressed to 80,000 pounds per square inch and maintained at this pressure by the injection of additional allyl alcohol, and at a temperature of 70° C., for a period of 12.5 hours. The polymerization reaction produced 1.02 grams of a solid homopolymer of allyl alcohol having a relative viscosity of 1.05.

Example VII

To the reactor and in the manner described in Example I, there were charged 0.025 gram of benzoyl peroxide and 10 milliliters of allyl alcohol at room temperature. The charge was compressed to 77,000 pounds per square inch and maintained at this pressure by the injection of additional allyl alcohol, and at a temperature of 109° C., for a period of 12.75 hours. The polymerization reaction produced 0.234 gram of a solid homopolymer of allyl alcohol having a relative viscosity of 1.086.

What is claimed is:

1. A process for the production of solid homopolymers of allyl alcohol which comprises contacting allyl alcohol with a catalytic amount of free-radical polymerization catalyst at a pressure of from about 15,000 pounds per square inch to about 125,000 pounds per square inch and at a temperature of from about −80° C. to about +100° C.

2. A process for the production of solid homopolymers of allyl alcohol which comprises contacting allyl alcohol with a catalytic amount of free-radical polymerization catalyst at a pressure of from about 20,000 pounds per square inch to about 100,000 pounds per square inch and at a temperature of from about −10° C. to about +70° C.

3. The process according to claim 2 wherein the catalyst is tributylboron.

4. The process according to claim 2 wherein the catalyst is benzoyl peroxide.

5. The process according to claim 2 wherein the catalyst is azobisisobutyronitrile.

References Cited by the Examiner

UNITED STATES PATENTS 2,541,155   2/1951   Dannenberg _____ 260—91.3

OTHER REFERENCES

Paint, Oil and Chemical Review, Resinous Polyhydric Alcohols, pp. 24–26 and 28, August 13, 1953, 260—91.3.

WILLIAM H. SHORT, *Primary Examiner.*

PHILIP E. MANGAN, JOSEPH R. LIBERMAN, *Examiners.*

L. P. QUAST, *Assistant Examiner.*